United States Patent [19]

Gellert

[11] Patent Number: 4,979,892
[45] Date of Patent: Dec. 25, 1990

[54] INJECTION MOLDING NOZZLE WITH SELF-SUPPORTING ACTUATING MECHANISM

[76] Inventor: Jobst U. Gellert, 7A Prince Street, Georgetown, Ontario, Canada, L7G 2X1

[21] Appl. No.: 331,230

[22] Filed: Mar. 31, 1989

[30] Foreign Application Priority Data

Feb. 28, 1989 [CA] Canada .................................. 592346

[51] Int. Cl.⁵ ............................................ B29C 45/23
[52] U.S. Cl. ................................. 425/549; 264/328.9; 264/328.15; 425/562; 425/564; 425/566
[58] Field of Search ...................... 264/328.11, 328.15, 264/328.9; 425/549, 562, 563, 564, 566, 595

[56] References Cited

U.S. PATENT DOCUMENTS

| | | | |
|---|---|---|---|
| 3,195,186 | 7/1965 | Gauban et al. | 425/595 |
| 3,716,318 | 2/1973 | Erik et al. | 425/563 |
| 4,222,733 | 9/1980 | Gellert | 425/566 |
| 4,433,969 | 2/1984 | Gellert | 425/548 |
| 4,698,013 | 10/1987 | Butcher | 425/549 |
| 4,702,689 | 10/1987 | Schmidt et al. | 425/548 |
| 4,768,283 | 9/1988 | Gellert | 29/611 |
| 4,787,840 | 11/1988 | Gellert | 425/549 |
| 4,793,795 | 12/1988 | Schmidt et al. | 425/549 |
| 4,810,184 | 3/1989 | Schmidt et al. | 425/548 |

OTHER PUBLICATIONS

American College Dictionary, Random House, 1969 p. 459.

Primary Examiner—Jay H. Woo
Assistant Examiner—Timothy W. Heitbrink
Attorney, Agent, or Firm—Riches, McKenzie & Herbert

[57] ABSTRACT

An injection molding nozzle having a self-supported valve member actuating mechanism. The elongated valve member extends rearwardly into a cylinder assembly which is mounted on the main body of the nozzle. The rear end of the valve member is connected to a pneumatically actuated piston to reciprocate it between the open and closed position. A wedge clamp removably attaches the cylinder assembly to a connector member which is bolted to the rear end of the main body of the nozzle.

2 Claims, 3 Drawing Sheets

4,979,892

INJECTION MOLDING NOZZLE WITH SELF-SUPPORTING ACTUATING MECHANISM

BACKGROUND OF THE INVENTION

This invention relates generally to injection molding and more particularly to a heated nozzle with self-supported valve member actuating mechanism.

Valve gated injection molding systems with each valve pin or member extending through a heated nozzle are well known. An early example of a mechanically actuated valve member is shown in the applicant's U.S. Pat. No. 4,222,733 which issued Sept. 16, 1980. Pneumatic and hydraulic actuating mechanisms are also known as described in the applicant's U.S. Pat. No. 4,433,969 which issued Feb. 28, 1984 and U.S. Pat. No. 4,698,013 to Butcher which issued Oct. 6, 1987. More recently, a system for mechanically actuating the whole nozzle is described in the applicant's U.S. Pat. No. 4,787,840 which issued Nov. 29, 1988.

It is also known that it is advantageous in the case of non-linear elongated cavities which are filled through several gates that the nozzles are mountable in different angular positions relative to one another. Examples of this are shown in Schmidt et al. U.S. Pat. Nos. 4,702,689 which issued Oct. 27, 1987, 4,810,184 which will issue Mar. 7, 1989 and 4,793,795 which issued Dec. 27, 1988. However, providing separately mounted valve member actuating mechanisms with the correct orientation for each nozzle is both costly and cumbersome.

SUMMARY OF THE INVENTION

Accordingly, it is an object of the invention to at least partially overcome the problems of the prior art by providing an injection molding nozzle with self-supported valve member actuating mechanism.

To this end, in one of its aspects, the invention provides an elongated heated valve gated injection molding nozzle having a main body with a rear end and a forward end to extend into a well in a cooled mold core, the main body having a side face adjacent the rear end and a central bore extending from the rear end to the forward end in alignment with a gate through the mold core to a cavity, an elongated valve member having a driven rear end and a forward end received in the central bore, the driven end of the valve member being operatively connected to actuating mechanism having a cylinder assembly to reciprocate the valve member longitudinally between a retracted open position and a forward closed position wherein the forward end of the valve member is sealed in the gate, the main body having a melt passage extending therethrough to convey melt from an inlet on the side face to an outlet at the forward end, the melt passage having a lateral portion which extends from the inlet to a longitudinal portion which extends in the central bore around the valve member to the outlet, having the improvement wherein the valve member has a portion which extends rearwardly from the rear end of the main body portion, and the actuating mechanism is securely mounted on the rear end of the main body portion to engage the driven end of the valve member to reciprocate the valve member between the open and closed positions Further objects and advantages of the invention will appear from the following description taken together with the accompanying drawings.

DETAILED DESCRIPTION OF THE DRAWINGS

Figure 1:
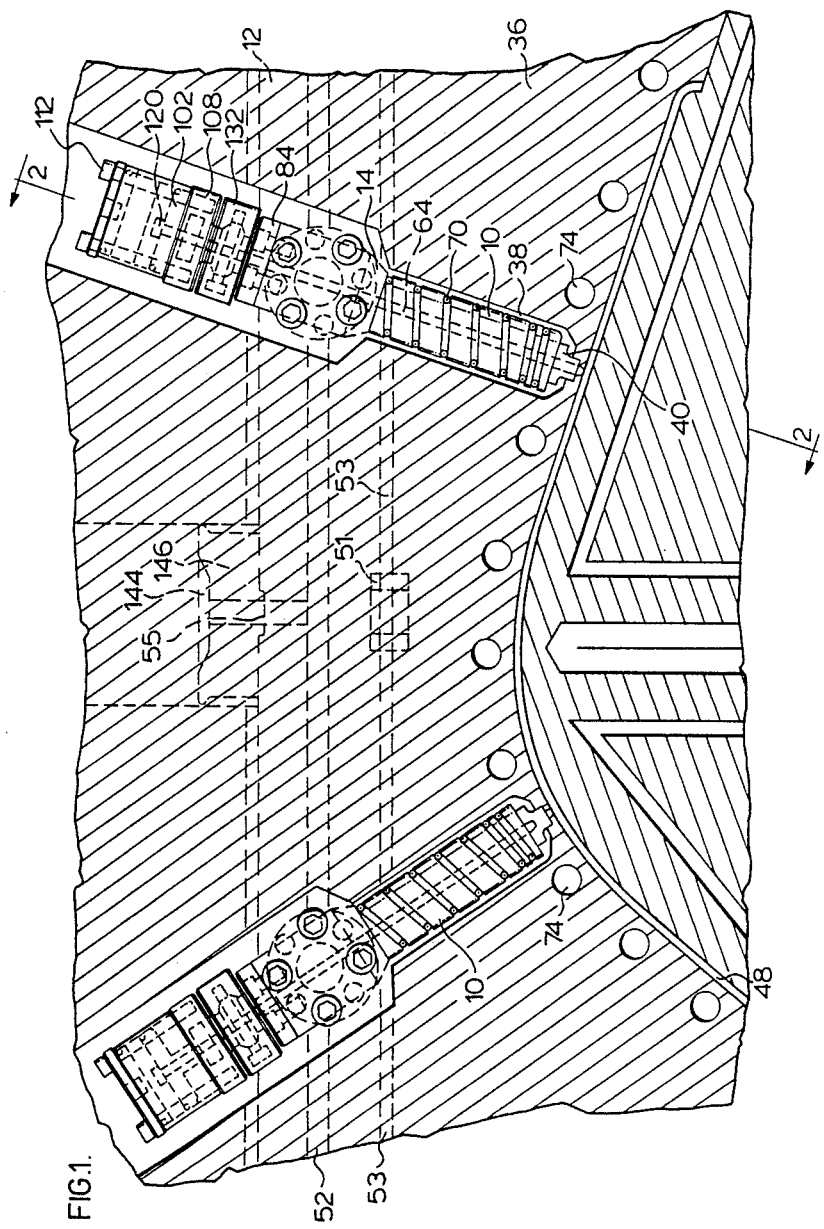
FIG. 1 is an elevation view of a portion of an injection molding system showing several nozzles according to a preferred embodiment of the invention mounted in different orientations to the side surface of an elongated manifold.
Figure 2:
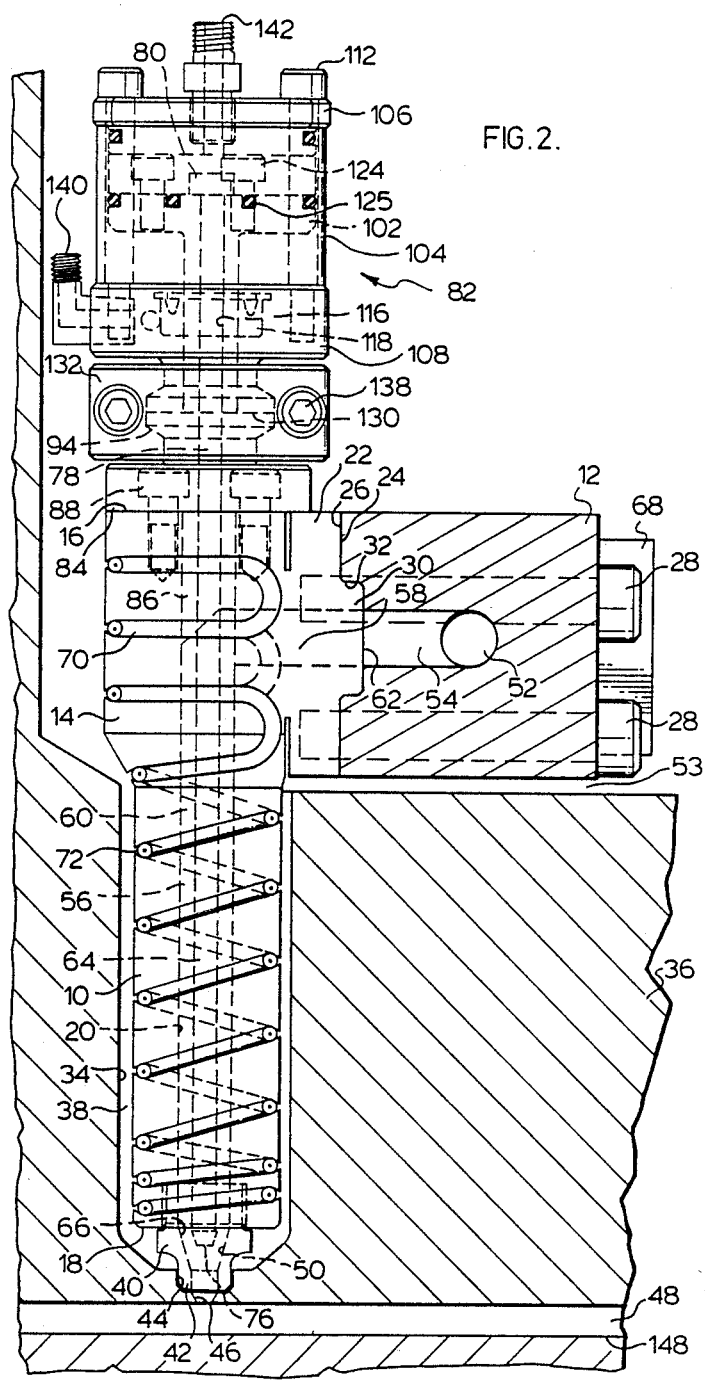
FIG. 2 is a cross section showing one of the nozzles.

Reference is first made to FIGS. 1 and 2 which show a portion of a valve gated injection molding system having several heated nozzles 10 attached in different orientations to an elongated steel manifold 12. The heated nozzles 10 each have a steel main body 14 with a rear end 16, a forward end 18, and a central bore 20 extending therebetween. Each nozzle 10 has an integral side portion 22 with a side face 24 adjacent the rear end 16 which is attached to the side surface 26 of the manifold 12 by bolts 28. The side portion 22 has central raised flange portion 30 which is received in a seat 32 in the side surface 26 of the manifold 12. Each nozzle 10 extends into a well 34 in a mold core or cavity plate 36 with an insulative air space 38 provided between the heated nozzle 10 and the surrounding cooled mold cavity plate 36. The nozzle 10 has a seal insert 40 which is screwed into the forward end 18 of the main body 14 to bridge the air space 38. The seal insert 40 has a cylindrical nose portion 42 which is received in a seat 44 around a gate 46 through the cavity plate 36 leading to a cavity 48. Thus, the nozzle 10 is located in a position in which the central bore 20 is in alignment with the gate 46, and the seal insert 40 has a tapered bore 50 which extends from the central bore 20 of nozzle 10 to the gate 46.

The elongated manifold 12 is located relative to the cavity plate 36 by a locating ring 51 to provide an insulative air space 53 between them. The manifold 12 has a longitudinal melt bore 52 which extends from an inlet 55 from which branch a number of lateral outlet bores 54. Each nozzle 10 has a melt passage 56 with a lateral portion 58 and a longitudinal portion 60. The lateral portion 58 extends from an inlet 62 on the side face 24 which aligns with one of the lateral outlet bores 54 of the manifold 12, and the longitudinal portion 60 extends around an elongated valve member 64 which is received in the central bore 20 to an outlet 66 at the forward end 18 leading to the gate 46. Melt which flows through the manifold 12 and the nozzles 10 is retained in a molten state by heating the manifold 12 with an electric plate heater 68 bolted to it and heating the nozzle 10 with an integral electric heating element 70. The heating element 70 has a chrome nickel resistance wire extending centrally through a refractory powder insulating material such as magnesium oxide inside a steel casing. It has a helical portion 72 which is brazed in a channel in the outer surface of the main body 14 and covered by a protective coating which is applied as described in the applicant's U.S. Pat. No. 4,768,283 which issued Sept. 6, 1988. The helical portion 72 of the heating element 70 encircles the longitudinal portion 60 of the melt passage 56 with a pitch which varies according to a predetermined configuration to maintain the melt flowing through the melt passage 56 at a more uniform temperature. The cavity plate 36 is cooled by pumping cooling water through cooling conduits 74.

Figure 3:
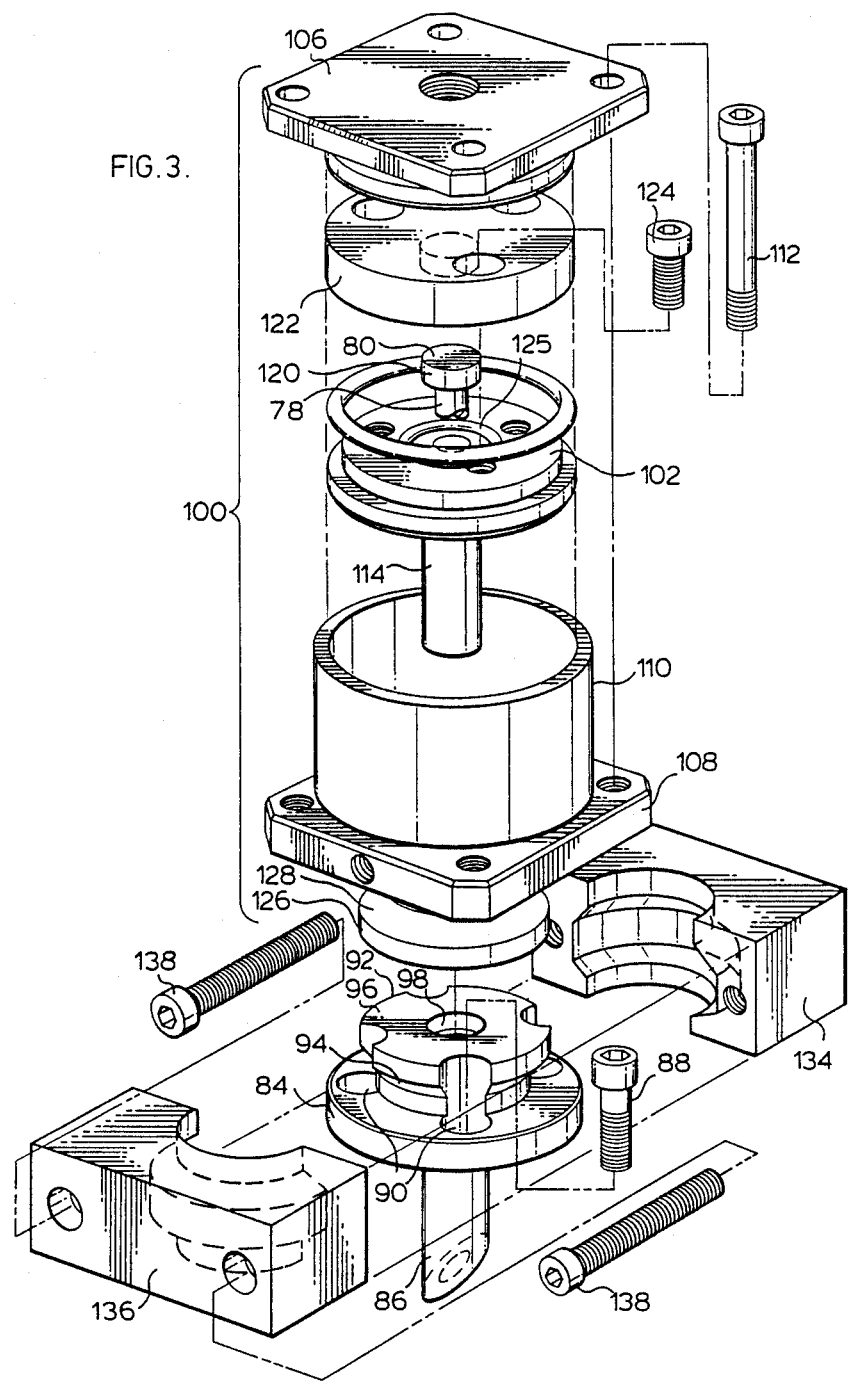
FIG. 3 is an exploded isometric view showing the actuating mechanism.

The elongated valve member 64 has a forward end 76 which is seated in the gate 46 in the forward closed position and a portion 78 which extends rearwardly from the rear end 16 of the main body 14 of the nozzle 10 to an enlarged driven rear end 80. The driven rear end 80 of the valve member 64 is engaged by the pneumatic actuating mechanism 82 which is mounted on the rear end 16 of the main body 14 of the nozzle 10 as now described with particular reference to FIG. 3. A steel connector member 84 having a sealing sleeve portion 86 extending therefrom is securely fixed to the rear end 16 of the main body 14 of the nozzle 10 by bolts 88 which extend through holes 90 into the main body 14 of the nozzle 10. The sealing sleeve portion 86 is seated in the central bore 20 and fits around the valve member 64 to prevent leakage of pressurized melt as the valve member 64 reciprocates. In this embodiment, the sealing sleeve portion 86 of the connector member 84 extends into the central bore 20 to where the lateral portion 58 of the melt passage 56 joins the longitudinal portion 60, and the forward end of the sealing sleeve portion 86 is shaped to redirect the melt around the bend between them. The connector member 84 has a rearwardly extending flange portion 92 with a tapered outer surface 94 and a rear face 96.

The rearwardly extending portion 78 of the valve member 64 passes through the central bore 98 of the connector member 84 into a cylinder assembly 100. The cylinder assembly 100 includes a piston 102 which reciprocates in a cylinder 104 which is formed by attaching a rear plate portion 106 to a forward portion 108 having a cylindrical outer wall 110 with bolts 112. The piston 102 has a hollow neck portion 114 which is received in a central bore 116 which extends forwardly through a high pressure seal 118 seated in the forward portion 108 of the cylinder 104. The valve member 64 extends through the neck portion 114 and the enlarged head 120 at the rear end 80 of the valve member and is secured to the piston 102 by a circular plate 122 which is fixed to the piston 102 by bolts 124 with an O-ring 125 to prevent leakage. The cylinder assembly 100 also has a flange portion 126 with a tapered outer surface 128 which extends forwardly to a forward face 130. In this embodiment, the cylinder assembly 100 is secured to the connector member 84 by a wedge clamp 132 which encircles the matching flange portion 92 of the connector member 84 and the flange portion 122 of the cylinder assembly 100. As the two halves 134,136 of the wedge clamps 132 are tightened together by bolts 138 the abutting rear and forward faces 96,130 of the flange portion 92,126 are secured together with the central bores 98,116 in alignment. Thus, when pneumatic pressure is applied to the cylinder 104 through connectors 140,142 on opposite sides of the piston 102, the piston and the valve member 64 are reciprocated between the retracted open position shown, and the forward closed position in which the forward end 76 of the valve member 64 is seated in the gate 46.

In use, the system is assembled as shown and electrical power is applied to the plate heater 68 and the heating element 70 to heat the manifold 12 and the nozzle 10 to a predetermined operating temperature. Pressurized melt from a molding machine (not shown) is then injected into the manifold melt bore 52 located at a recessed inlet 144 in a locating ring 146 according to a predetermined operating cycle. Pneumatic pressure is also applied to each cylinder 104 according to the cycle to position the valve member in the retracted open position when he injection melt pressure is applied. The melt flows through the melt passage 56 in each nozzle 10 and through the gates 46 to fill the cavity 48. After the cavity 48 is full, injection pressure is held momentarily to pack and pneumatic pressure is then applied to each cylinder 104 to drive the valve members 64 to the forward close position in which the forward end 76 of each valve member 64 is seated in a respective gate 46. Injection pressure is then released and after a short cooling period, the mold is opened along the parting ling 148 to eject the molded product. After ejection, the mold is closed and pneumatic pressure is reapplied to the cylinders 104 to withdraw the valve members 64 to the open position and injection pressure is reapplied to refill the cavity 48. This cycle is repeated continuously with a frequency dependent upon the size of cavity and type of material being molded.

While the description of the injection molding system having nozzles with self-supported actuating mechanism has been given with respect to a preferred embodiment, it is not to be construed in a limiting sense. Variations and modifications will occur to those skilled in the art. For instance, the actuating mechanism can have a different configuration and can be hydraulically actuated. Furthermore, the cylinder assembly 100 can be attached to the main body 14 of the nozzle 10 by bolts, rather than being clamped to the connector member 84. Reference is made to the appended claims for a definition of the invention.

What I claim is:

1. In an elongated heated valve gated injection molding nozzle having a main body portion which extends into a well in a cooled mold core, the main body portion having a rear end, a forward end and a side face adjacent the rear end and a central bore extending from the rear end to the forward end in alignment with a gate through the mold core to a cavity, an elongated valve member having a driven rear end and a forward end received in the central bore, the driven rear end of the valve member being operatively connected to an actuating mechanism having a cylinder assembly to reciprocate the valve member longitudinally between a retracted open position and a forward closed position wherein the forward end of the valve member is sealed in the gate, the cylinder assembly of the actuating mechanism including a piston which is mounted in a cylinder, the piston being connected to the driven end of the valve member which extends into the cylinder whereby the piston reciprocates in the cylinder to reciprocate the valve member between the open and closed positions, the main body portion having a melt passage extending therethrough to convey melt from an inlet on the side face to an outlet at the forward end, the melt passage having a lateral portion which extends from the inlet to a longitudinal portion which extends in the central bore around the valve member to the outlet, the improvement wherein;

the valve member has a portion which extends rearwardly from the rear end of the main body portion, a rearwardly facing flange portion surrounding the valve member and extending rearwardly from the rear end of the main body portion, a forwardly facing flange portion surrounding the valve member and extending forwardly from the cylinder assembly, and the forwardly facing flange portion is removably secured to the rearwardly facing flange portion by clamping means, the clamping means including first and second opposed portions which are tightened together over said flange portions by laterally extending tightening means, whereby the actuating mechanism is securely mounted on the rearwardly facing flange portion to engage the driven end of the valve number to reciprocate the valve member between the open and closed positions.

2. An injection molding nozzle as claimed in claim 1 wherein the rearwardly facing flange portion extends from a connector member, the connector member being secured to the rear end of the main body of the nozzle, the connector member having a sealing sleeve portion which extends into the central bore around the valve member to prevent the leakage of melt around the valve member as the valve member reciprocates.

* * * * *